US012779996B2

(12) United States Patent
Mikayama

(10) Patent No.: US 12,779,996 B2
(45) Date of Patent: Nov. 3, 2026

(54) DISPLAY DEVICE AND HEAD-UP DISPLAY

(71) Applicant: Panasonic Automotive Systems Co., Ltd., Kanagawa (JP)

(72) Inventor: Satoshi Mikayama, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 19/272,753

(22) Filed: Jul. 17, 2025

(65) Prior Publication Data

US 2026/0054569 A1 Feb. 26, 2026

(30) Foreign Application Priority Data

Aug. 21, 2024 (JP) ................................ 2024-139383

(51) Int. Cl.

*B60K 35/234* (2024.01)
*B60K 35/29* (2024.01)
*B60K 35/81* (2024.01)

(52) U.S. Cl.

CPC ............ *B60K 35/234* (2024.01); *B60K 35/29* (2024.01); *B60K 35/81* (2024.01); *B60K 2360/334* (2024.01)

(58) Field of Classification Search

CPC ...... B60K 35/234; B60K 35/81; B60K 35/29; B60K 2360/334

See application file for complete search history.

(56) References Cited

U.S. PATENT DOCUMENTS

| | | | | |
|---|---|---|---|---|
| 11,197,359 | B1 * | 12/2021 | Lin | H05B 45/46 |
| 2021/0405364 | A1 * | 12/2021 | Franke | B60K 35/415 |

FOREIGN PATENT DOCUMENTS

| | | |
|---|---|---|
| JP | 2016-045244 | 4/2016 |
| JP | 6299523 | 3/2018 |

* cited by examiner

*Primary Examiner* — Robert J Michaud

(74) *Attorney, Agent, or Firm* — Greenblum & Bernstein, P.L.C.

(57) ABSTRACT

Display device includes a plurality of light emitters and current drawing unit that achieves local dimming by the plurality of light emitters on light emission surface. Current drawing unit includes T driver circuits, where T is an integer of 2 or larger. Each of the T driver circuits is connected to at least one light emitter of the plurality of light emitters. Light emission surface is divided into N local zones in correspondence with a layout of the plurality of light emitters, where N is an integer of 2 or larger. When an area of light emission surface is defined as S, area $S_{Tn}$ of a local zone group including at least one local zone that emits light in accordance with a specific driver circuit serving as any one of the T driver circuits satisfies $S_{Tn}>(S/T+S/N)$ or $S_{Tn}<(S/T-S/N)$.

9 Claims, 9 Drawing Sheets

DISPLAY DEVICE AND HEAD-UP DISPLAY

CROSS REFERENCE TO RELATED APPLICATION

The present application is based on and claims priority of Japanese Patent Application No. 2024-139383 filed on Aug. 21, 2024.

FIELD

The present disclosure relates to, for example, display devices installed in, for example, vehicles.

BACKGROUND

Conventionally, projection-type display devices, such as head-up displays installed in vehicles, are challenged by heat generated by projection light sources. However, in recent years, local dimming that involves illuminating a liquid crystal panel in zones has been proposed as a solution (e.g., see Patent Literature (PTL) 1). This display device includes a liquid crystal panel, a backlight, a temperature detector, and a controller. The backlight is disposed at the rear surface of the liquid crystal panel and illuminates only sections of the liquid crystal panel where there is display content on a zone-by-zone basis. In other words, local dimming is performed so as to not illuminate sections where there is no display content, thereby reducing the amount of generated heat.

CITATION LIST

Patent Literature

PTL 1: Japanese Unexamined Patent Application Publication No. 2016-45244

SUMMARY

However, the display device according to PTL 1 described above can be improved upon.

In view of this, the present disclosure provides a display device, or the like, capable of improving upon the above related art.

A display device according to an aspect of the present disclosure performs local dimming and includes: a plurality of light emitters arranged in a matrix; and a current drawing unit that performs control for drawing electric current flowing through the plurality of light emitters to achieve the local dimming by the plurality of light emitters on a light emission surface, the current drawing unit including T driver circuits, T being an integer of 2 or larger, wherein each of the T driver circuits is connected to at least one light emitter of the plurality of light emitters, the light emission surface is divided into N local zones in correspondence with a layout of the plurality of light emitters, N being an integer of 2 or larger, and when an area of the light emission surface is defined as S, area $S_{Tn}$ of a local zone group including at least one local zone that emits light in accordance with a specific driver circuit serving as any one of the T driver circuits satisfies $S_{Tn}>(S/T+S/N)$ or $S_{Tn}<(S/T-S/N)$.

This comprehensive or specific aspect may be achieved in accordance with, for example, a system or a method, or may be achieved in accordance with, for example, an arbitrary combination of systems or methods.

The display device according to the present disclosure is capable of improving upon the above related art.

Further advantages and effects of the aspect of the present disclosure will become apparent from the description and the drawings. The advantages and/or effects are respectively provided by several embodiments and features indicated in the description and the drawings, but do not necessarily have to be entirely provided for obtaining one or more identical features.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
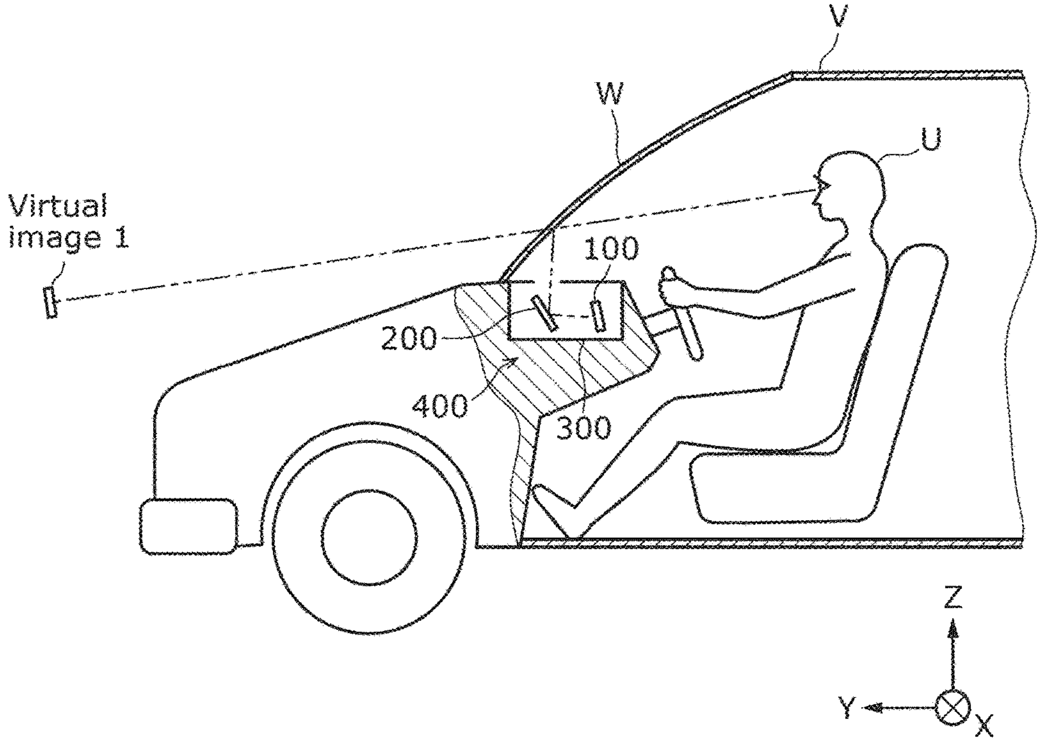
FIG. 1 is a diagram illustrating the layout and configuration of a head-up display according to an embodiment.

DESCRIPTION OF EMBODIMENT (Underlying Knowledge Forming Basis of the Present Disclosure)

The present inventor has found that the following problem occurs in the display device according to PTL 1 described in the Background section.

The display device according to PTL 1 described above performs local dimming, as mentioned above. In this local dimming, the backlight independently dims each of multiple zones included in the liquid crystal panel. Each zone where a display image is displayed is selectively illuminated, so that the power consumption of the backlight is reduced, whereby the amount of heat generated by the backlight can be suppressed.

The controller may sometimes include multiple driver circuits the number of which corresponds to the number of zones included in the liquid crystal panel. The multiple zones included in the liquid crystal panel may sometimes include at least one zone (also referred to as a constant display region hereinafter) where a display image is displayed constantly or at high frequency, and at least one zone (also referred to as a warning display region) where a display image is not constantly displayed or is displayed at low frequency. In such a case, when the multiple driver circuits control the same number of zones, that is, the regions with the same area in the backlight, unevenness in generated heat tends to occur between the driver circuits. For example, if one driver circuit only controls m zones (m being an integer of 1 or larger) serving as constant display regions, a large amount of heat is steadily generated in the driver circuit, resulting in a large time-averaged amount of generated heat. On the other hand, if another driver circuit only controls m zones serving as warning display regions, the driver circuit remains in an unlit state for a long period of time, resulting in a small time-averaged amount of generated heat. Accordingly, the display device according to PTL 1 mentioned above is problematic in that, if the multiple driver circuits respectively control the regions with the same area in the backlight, unevenness tends to occur in the heat generated in the driver circuits. Specifically, the display device according to PTL 1 described above takes into account only the heat generated by the liquid crystal panel, but not heat generated during a current drawing process at a driver circuit. This is not negligible since generally 10% of power consumption of a light emitter occurs at the driver circuit.

In order to solve this problem, a display device according to a first aspect of the present disclosure performs local dimming and includes: a plurality of light emitters arranged in a matrix; and a current drawing unit that performs control for drawing electric current flowing through the plurality of light emitters to achieve the local dimming by the plurality of light emitters on a light emission surface, the current drawing unit including T driver circuits, T being an integer of 2 or larger. Each of the T driver circuits is connected to at least one light emitter of the plurality of light emitters. The light emission surface is divided into N local zones in correspondence with a layout of the plurality of light emitters, N being an integer of 2 or larger. When an area of the light emission surface is defined as S, area $S_{Tn}$ of a local zone group including at least one local zone that emits light in accordance with a specific driver circuit serving as any one of the T driver circuits satisfies $S_{Tn}>(S/T+S/N)$ or $S_{Tn}<(S/T-S/N)$. In this case, S/T is obtained by dividing the area of the liquid crystal panel by the number of driver circuits and is an average area (also referred to as a first average area hereinafter) of a region controlled by one driver circuit, and S/N is an average area (also referred to as a second average area hereinafter) of local zones individually controllable by local dimming. The local zones may be constituted of multiple light emitters, such as multiple backlights.

Accordingly, when area $S_{Tn}$ of the local zone group including the at least one local zone that emits light in accordance with the specific driver circuit is larger than the sum of the first average area (S/T) and the second average area (S/N), local zone groups respectively controlled by at least two driver circuits can have areas different from each other. Furthermore, even when area $S_{Tn}$ is smaller than a difference between the first average area (S/T) and the second average area (S/N), local zone groups respectively controlled by at least two driver circuits can have areas different from each other. As a result, even in a case where a liquid crystal panel includes a constant display region and a warning display region, a local zone group is set in accordance with the average amount of heat generated in each local zone, so that unevenness in heat generated in the current drawing unit, that is, the T driver circuits, can be suppressed. Consequently, a temperature increase caused by heat generated in the driver circuits can be suppressed.

In the display device according to a second aspect, the light emission surface may include a first region and a second region, the first region may include at least one local zone of the N local zones, and the second region may include at least one local zone of the N local zones and emit light for a longer period of time than the first region. The second aspect may be dependent on the first aspect. The first region corresponds to, for example, a warning display region of the aforementioned liquid crystal panel, and the second region corresponds to, for example, a constant display region of the aforementioned liquid crystal panel.

Accordingly, when the liquid crystal panel includes two regions with different display time periods, such as the constant display region and the warning display region, unevenness in heat generated in the current drawing unit, that is, the T driver circuits, can be suppressed.

In the display device according to a third aspect, the local zone group that emits the light in accordance with the specific driver circuit may include the at least one local zone included in the second region. The third aspect may be dependent on the second aspect.

Accordingly, when $S_{Tn}<(S/T-S/N)$ is satisfied, the display frequency of the local zone group corresponding to the specific driver circuit (Tn) is high, so that even if the local zone group is emitting light for a relatively long period of time, area $S_{Tn}$ of the local zone group is smaller than average. Thus, heat generated in the specific driver circuit can be suppressed, and can be made nearly equal to that in the other driver circuits.

The display device according to a fourth aspect may further include a controller that controls the T driver circuits. The controller may switch a driver circuit that is included in the T driver circuits and that draws the electric current flowing through any one light emitter included in the plurality of light emitters to another driver circuit included in the T driver circuits. The fourth aspect may be dependent on any one of the first to third aspects.

Consequently, unevenness in heat generated in two switchable driver circuits can be further suppressed.

In the display device according to a fifth aspect, the T driver circuits may include two driver circuits. A light emitter included in the plurality of light emitters and connected to a first one of the two driver circuits and a light emitter included in the plurality of light emitters and connected to a second one of the two driver circuits may differ in quantity by two or more. The fifth aspect may be dependent on any one of the first to fourth aspects.

Consequently, the numbers of light emitters respectively connected to the two driver circuits differ from each other by two or more. Therefore, even when the multiple light emitters include at least one light emitter with high load power and at least one light emitter with low load power, the possibility of causing the two driver circuits to have nearly equal average power consumption can be enhanced.

In the display device according to a sixth aspect, at least one driver circuit of the T driver circuits may include a plurality of terminals. The plurality of terminals may include a plurality of connection terminals. Each of the plurality of connection terminals may be connected to one light emitter serving as any one of the plurality of light emitters. A terminal included in the plurality of terminals and not connected to the one light emitter may be disposed between two connection terminals of the plurality of connection terminals. The sixth aspect may be dependent on any one of the first to fifth aspects.

Accordingly, the multiple connection terminals are arranged in a distributed manner without all of them being adjacent to each other, so that the channels corresponding to the connection terminals can also be arranged in a distributed manner. Therefore, heat generated in the channels can be distributed. Each channel is, for example, a switch, such as a transistor, for drawing electric current. Consequently, unevenness in heat generated in the driver circuits can be suppressed.

In the display device according to a seventh aspect, at least one driver circuit of the T driver circuits may include a plurality of channels each of which switches between on and off for drawing the electric current. The plurality of channels may include a plurality of connection channels. Each of the plurality of connection channels may be connected to one light emitter serving as any one of the plurality of light emitters. A channel included in the plurality of channels and not connected to the one light emitter may be disposed between two connection channels of the plurality of connection channels. The seventh aspect may be dependent on any one of the first to sixth aspects.

Accordingly, the multiple connection channels are arranged in a distributed manner without all of them being adjacent to each other, so that heat generated in the channels can be distributed. Therefore, unevenness in heat generated in the driver circuits can be suppressed.

A head-up display according to a first aspect of the present disclosure includes: the display device according to any one of the first to seventh aspects; a mirror that reflects light output from the display device; and a housing that accommodates the display device and the mirror.

Accordingly, advantageous effects similar to those of the display device according to any one of the first to seventh aspects described above can be exhibited.

An embodiment will be described in detail below with reference to the drawings.

The embodiment to be described below is a comprehensive or specific example. Numerical values, shapes, materials, components, positions and connection methods of the components, and so on indicated in the embodiment below are examples, and are not intended to limit the present disclosure. Among the components in the embodiment below, components not indicated in the independent claims indicating the highest-level concept are described as arbitrary components.

Each drawing is a schematic view and is not necessarily a precise illustration. In the drawings, identical components are given the same reference sign. Furthermore, in the following embodiment and the like, an expression such as "nearly equal" is used. For example, the expression "nearly equal" not only has the meaning of "exactly equal", but also has the meaning of "substantially equal", which implies that, for example, an error of about several percent is included. Moreover, the expression "nearly equal" has the meaning of "equal" within a range in which the advantageous effects of the present disclosure may be exhibited. The same applies to other expressions using "nearly".

EMBODIMENT

FIG. 1 is a diagram illustrating the layout and configuration of a head-up display according to this embodiment. In this embodiment, the vertical direction is referred to as a Z-axis direction, the front-rear direction of vehicle V is referred to as a Y-axis direction, and the left-right direction of vehicle V is referred to as an X-axis direction. The positive side of the Z-axis direction corresponds to up, above, upward, or the upper side, whereas the negative side of the Z-axis direction corresponds to down, below, downward, or the lower side. The Y-axis direction is parallel to the horizontal direction. The positive side of the Y-axis direction corresponds to front, ahead, forward, or the front side, whereas the negative side of the Y-axis direction corresponds to rear, behind, rearward, or the rear side. The X-axis direction is parallel to the horizontal direction. The positive side of the X-axis direction corresponds to right, rightward, or the right side, whereas the negative side of the X-axis direction corresponds to left, leftward, or the left side.

Head-up display 400 according to this embodiment is installed in, for example, vehicle V and forms virtual image 1. Virtual image 1 is visually recognized by observer U serving as a driver driving vehicle V such that, for example, virtual image 1 exists at a front outer side of vehicle V. Head-up display 400 includes housing 300, display device 100, and mirror 200.

Housing 300 is, for example, a resin molded product and is disposed inside a dashboard of vehicle V. Housing 300 accommodates display device 100 and mirror 200.

Display device 100 outputs light representing an image from a display surface. In other words, display device 100 displays an image to be visually recognized as virtual image 1 by observer U. Display device 100 is, for example, a picture generation unit (PGU) including a liquid crystal display (LCD). The LCD includes a liquid crystal panel and a backlight, and performs local dimming.

Mirror 200 reflects the light output from display device 100 and guides the light to windshield W, so as to form virtual image 1 at a side opposite from observer U relative to windshield W. In other words, when receiving the light output from display device 100, mirror 200 reflects the light toward windshield W. For example, mirror 200 reflects the light toward the upper side of vehicle V. As a result, when receiving the light from mirror 200, windshield W reflects the light toward the eyes of observer U. Accordingly, observer U can visually recognize, via windshield W, an object, such as a road, a pedestrian, or a structure, located at the front outer side of vehicle V, as well as virtual image 1 superimposed on the object.

Figure 2:
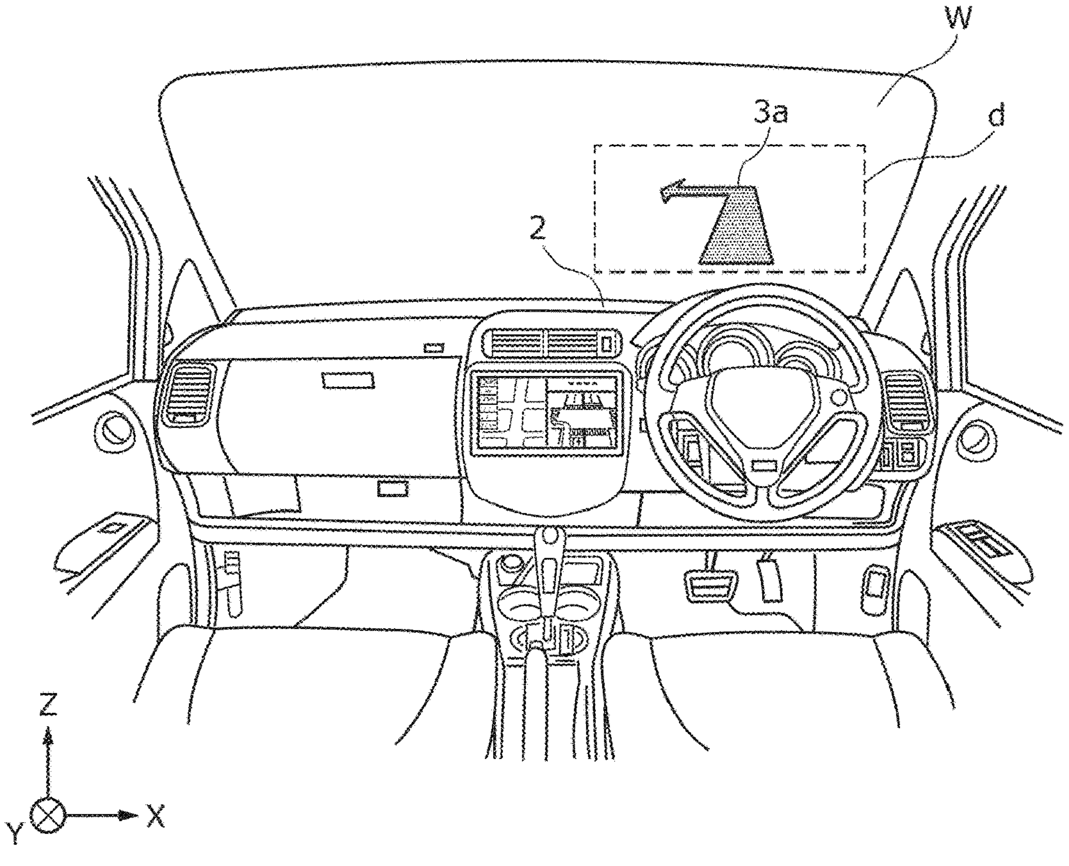
FIG. 2 is a diagram illustrating an example of the interior of a vehicle including the head-up display according to the embodiment.

FIG. 2 is a diagram illustrating an example of the interior of vehicle V including head-up display 400 according to this embodiment.

Head-up display 400 projects light onto windshield W while being hidden within dashboard 2. The projection of the light by head-up display 400 causes display object 3*a* to appear as virtual image 1 within display range d on windshield W. Display object 3*a* is, for example, an arrow indicating the travel direction of vehicle V.

Figure 3:
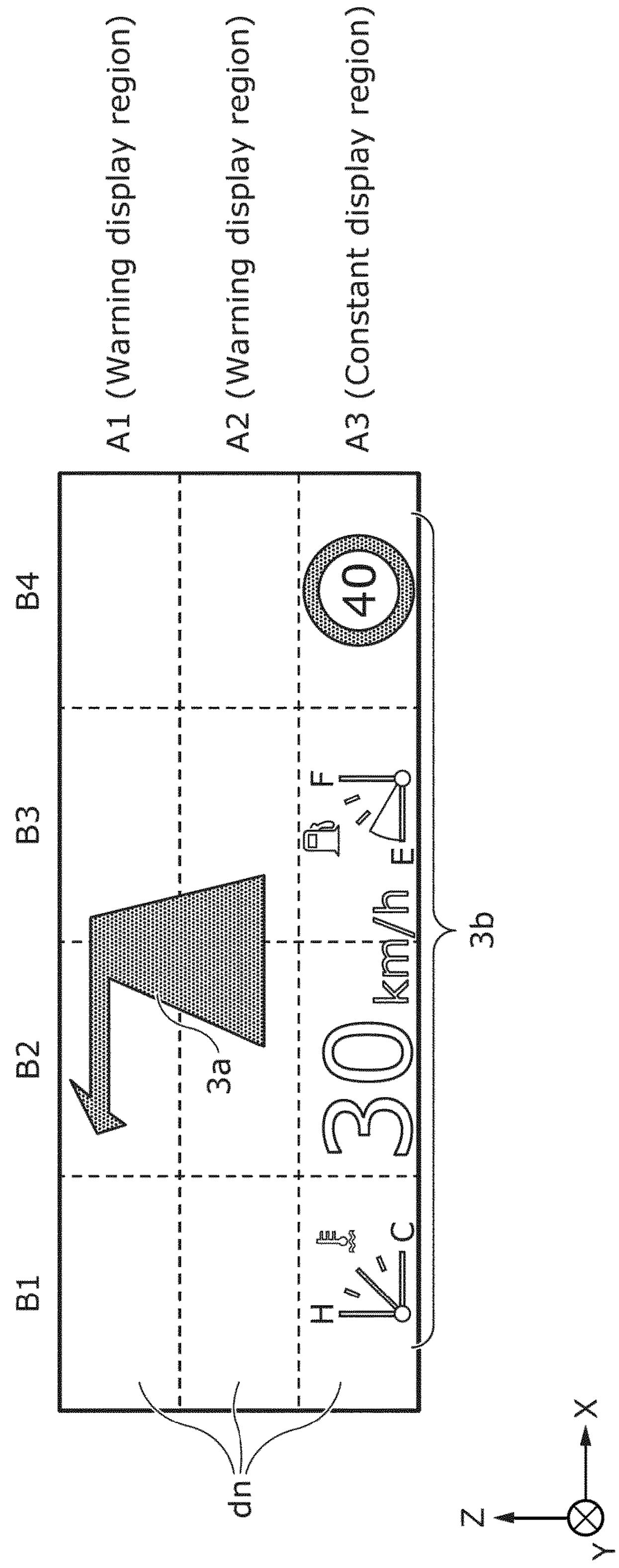
FIG. 3 is a diagram illustrating a specific example of a display object appearing in a display range according to the embodiment.

FIG. 3 is a diagram illustrating a specific example of a display object appearing in display range d.

For example, in display range d, display object 3*b* also appears as virtual image 1 in addition to display object 3*a* mentioned above. Examples of display object 3*b* include a water temperature gauge, a speedometer, a fuel gauge, and a speed limit. Display range d is divided into multiple segmented zones dn. For example, multiple segmented zones dn are arranged in a three-row by four-column matrix. The three rows are row A1, row A2, and row A3, whereas the four columns are column B1, column B2, column B3, and column B4. The number of rows and the number of columns are examples and are not limited to the aforementioned numerical values.

Head-up display 400 adjusts the intensity of light for each segmented zone dn. More specifically, for example, head-up display 400 switches each segmented zone dn between a lit mode and an unlit mode in accordance with local dimming by display device 100. The lit mode of segmented zone dn causes a display object to be displayed within segmented zone dn, whereas the unlit mode of segmented zone dn causes the display object to be not displayed within segmented zone dn.

Instead of being constantly displayed, a display object, such as display object 3*a*, is displayed in eight segmented zones dn located in row A1 and row A2 of display range d depending on, for example, the status of vehicle V or in response to an operation by observer U. On the other hand, a display object, such as display object 3*b*, is nearly constantly displayed in four segmented zones dn located in row A3 of display range d regardless of, for example, the status of vehicle V or an operation by observer U. Therefore, a region including four segmented zones dn located in row A1 and a region including four segmented zones dn located in row A2 are each referred to as a warning display region. On the other hand, a region including four segmented zones dn located in row A3 is referred to as a constant display region.

Figure 4:
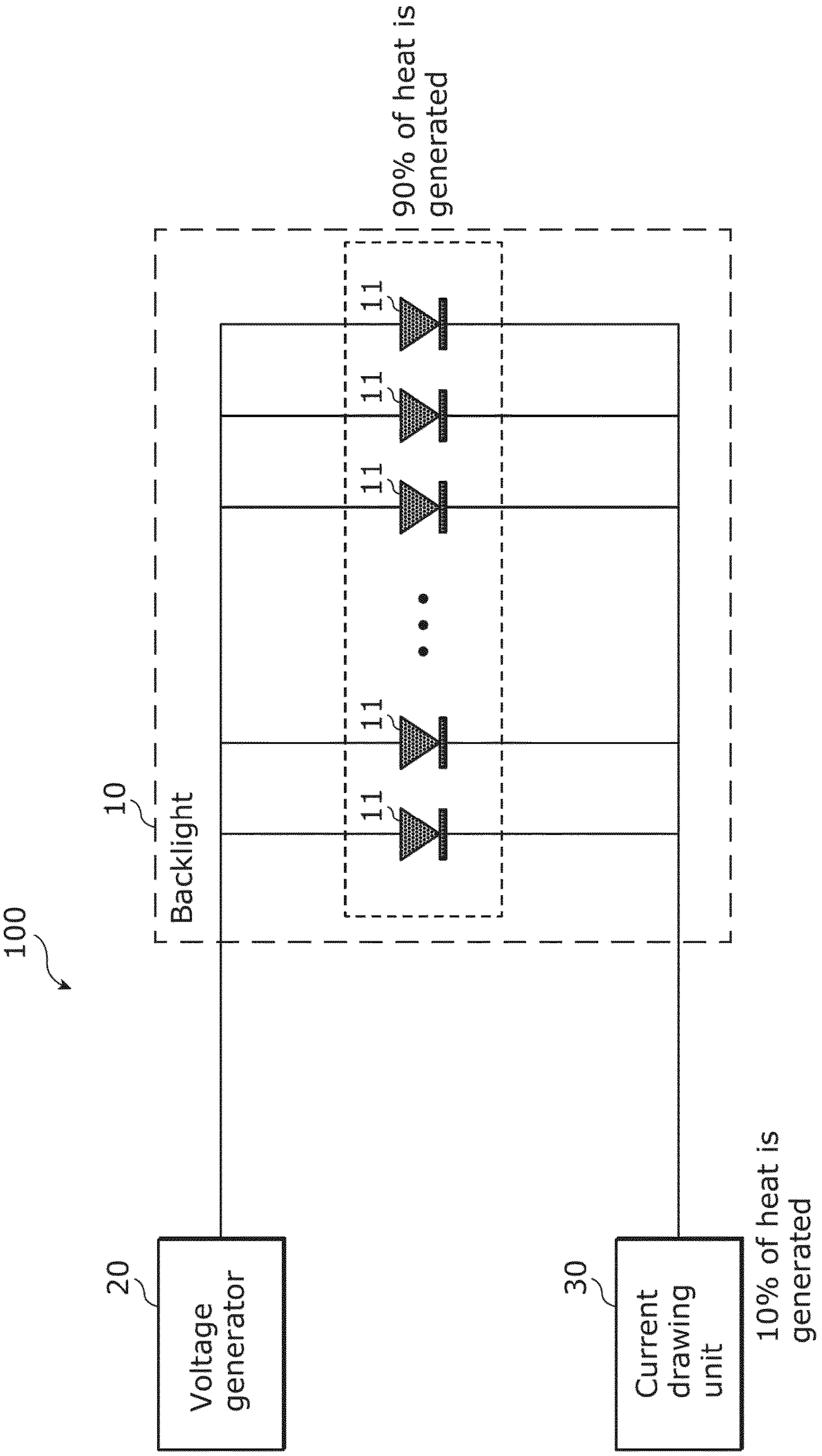
FIG. 4 is a diagram illustrating an example of the schematic configuration of a display device according to the embodiment.

FIG. 4 is a diagram illustrating an example of the schematic configuration of display device 100.

Display device 100 includes backlight 10, voltage generator 20, and current drawing unit 30.

Backlight 10 includes multiple light emitters 11. Each light emitter 11 is, for example, a light emitting diode (LED). Voltage generator 20 generates voltage to be applied to backlight 10. Current drawing unit 30 performs control for drawing electric current flowing through multiple light emitters 11 included in backlight 10. By performing this control, current drawing unit 30 causes multiple light emitters 11 at a light emission surface of backlight 10 to achieve local dimming.

Of heat generated by display device 100, for example, 90% of the heat is generated in backlight 10, whereas 10% of the heat is generated in current drawing unit 30. Display device 100 according to this embodiment suppresses unevenness in heat generated in current drawing unit 30.

Figure 5:
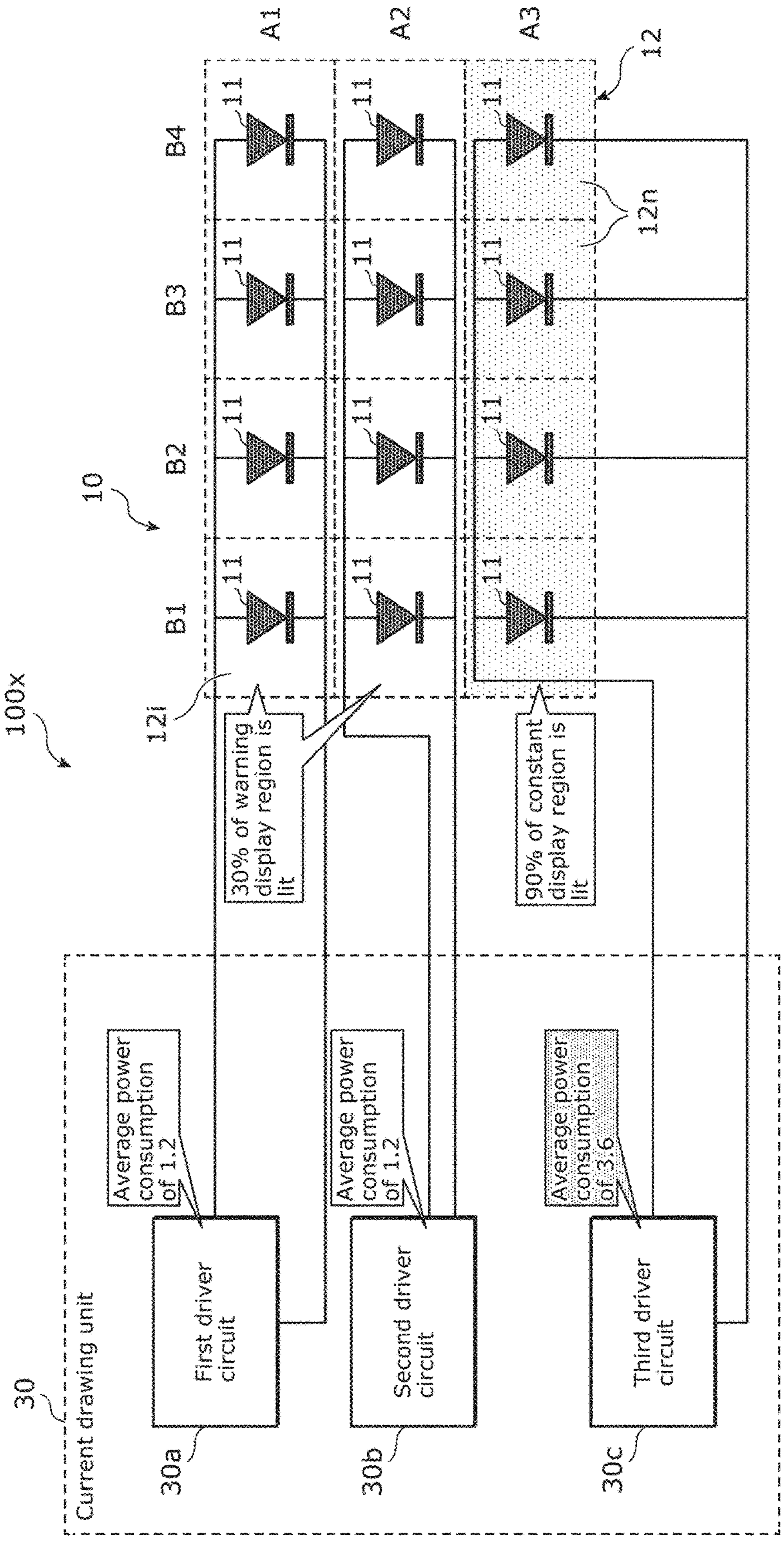
FIG. 5 is a diagram for explaining heat generated in a current drawing unit included in a display device serving as a comparative target.

FIG. 5 is a diagram for explaining the heat generated in current drawing unit 30 included in a display device serving as a comparative target.

Display device 100*x* serving as a comparative target includes current drawing unit 30 and backlight 10. Backlight 10 includes twelve light emitters 11. As illustrated in FIG. 5, twelve light emitters 11 are arranged in a three-row by four-column matrix. The three rows are row A1, row A2, and row A3, whereas the four columns are column B1, column B2, column B3, and column B4. As illustrated in FIG. 5, light emission surface 12 of backlight 10 is divided into twelve local zones 12*i* in correspondence with the layout of twelve light emitters 11.

Current drawing unit 30 includes first driver circuit 30*a*, second driver circuit 30*b*, and third driver circuit 30*c*. First driver circuit 30*a*, second driver circuit 30*b*, and third driver circuit 30*c* each serve as, for example, an integrated circuit (IC), and are simply collectively referred to as driver circuits.

First driver circuit 30*a* performs, for example, control for individually drawing electric current flowing through each of four light emitters 11 located in row A1 of backlight 10. By performing this control, first driver circuit 30*a* causes four light emitters 11 to individually emit light. In other words, four local zones 12*i* corresponding to relevant light emitters 11 individually emit light. The light emission from relevant local zones 12*i* causes a display object to be individually displayed in four segmented zones dn located in row A1 within display range d illustrated in FIG. 3.

Second driver circuit 30*b* performs, for example, control for individually drawing electric current flowing through each of four light emitters 11 located in row A2 of backlight 10. By performing this control, second driver circuit 30*b* causes four light emitters 11 to individually emit light. In other words, four local zones 12*i* corresponding to relevant light emitters 11 individually emit light. The light emission from relevant local zones 12*i* causes a display object to be individually displayed in four segmented zones dn located in row A2 within display range d illustrated in FIG. 3.

Third driver circuit 30*c* performs, for example, control for individually drawing electric current flowing through each of four light emitters 11 located in row A3 of backlight 10. By performing this control, third driver circuit 30*c* causes four light emitters 11 to individually emit light. In other words, four local zones 12*i* corresponding to relevant light emitters 11 individually emit light. The light emission from relevant local zones 12*i* causes a display object to be individually displayed in four segmented zones dn located in row A3 within display range d illustrated in FIG. 3.

The region including four segmented zones dn located in row A1 of display range d and the region including four segmented zones dn located in row A2 of display range d are warning display regions. The region including four segmented zones dn located in row A3 of display range d is a constant display region. In the warning display regions, for example, display object 3*a* is displayed in a period of 30% of a predetermined period. In the constant display region, for example, display object 3*b* is displayed in a period of 90% of the predetermined period. Each of the percentages of, for example, 30% and 90% is also referred as a display rate.

As a result, assuming that the power consumption when one local zone 12*i* is continuously lit is 1, the average power consumption over time of each of first driver circuit 30*a* and second driver circuit 30*b* is $0.3\times4=1.2$. The average power consumption over time of third driver circuit 30*c* is $0.9\times4=3.6$. Since the display rate of each warning display region is 30%, the average power occurring in one local zone 12*i* corresponding to the warning display region is expressed as 0.3. Likewise, since the display rate of the constant display region is 90%, the average power occurring in one local zone 12*i* corresponding to the constant display region is expressed as 0.9.

Accordingly, since the average power consumption varies depending on driver circuits, unevenness occurs in the heat generated in the driver circuits. In other words, a large amount of heat is generated in third driver circuit 30*c*.

Figure 6:
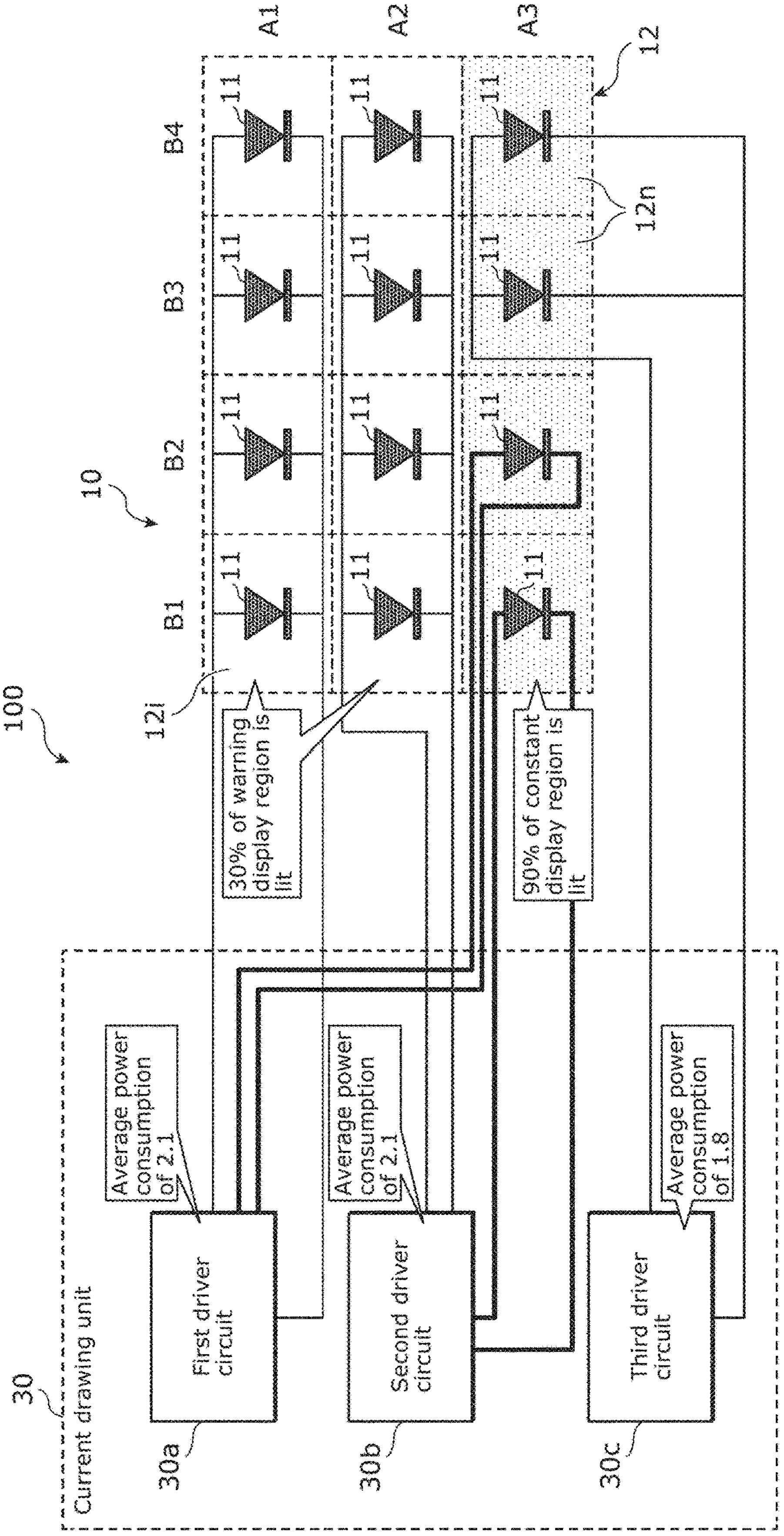
FIG. 6 is a diagram for explaining the configuration of the display device according to the embodiment and heat generated in a current drawing unit included in the display device.

FIG. 6 is a diagram for explaining the configuration of display device 100 according to this embodiment and the heat generated in current drawing unit 30 included in display device 100.

Similar to the example in FIG. 5, backlight 10 includes twelve light emitters 11. As illustrated in FIG. 6, twelve light emitters 11 are arranged in a three-row by four-column matrix. As illustrated in FIG. 6, light emission surface 12 of backlight 10 is divided into twelve local zones 12*i* in correspondence with the layout of twelve light emitters 11. In other words, light emission surface 12 of backlight 10 is divided into N (N being an integer of 2 or larger) local zones 12*i* in correspondence with the layout of multiple light emitters 11. In the example in FIG. 6, N=12. Local zones 12*i* each serve as a region where light is emitted by one light emitter 11, and have equal areas.

Similar to the example in FIG. 5, current drawing unit 30 includes first driver circuit 30*a*, second driver circuit 30*b*, and third driver circuit 30*c*.

First driver circuit 30*a* according to this embodiment is connected to four light emitters 11 located in row A1 of backlight 10 and to one light emitter 11 located in row A3 and column B2 of backlight 10, and performs control for individually drawing electric current flowing through relevant light emitters 11. By performing this control, first driver circuit 30*a* causes five light emitters 11 to individually emit light. In other words, five local zones 12*i* corresponding to relevant light emitters 11 individually emit light. The light emission from relevant local zones 12*i* causes display objects to be individually displayed in four segmented zones dn located in row A1 within display range d illustrated in FIG. 3 and in one segmented zone dn located in row A3 and column B2 within display range d.

Second driver circuit 30*b* according to this embodiment is connected to four light emitters 11 located in row A2 of backlight 10 and to one light emitter 11 located in row A3 and column B1 of backlight 10, and performs control for individually drawing electric current flowing through relevant light emitters 11. By performing this control, second driver circuit 30*b* causes five light emitters 11 to individually emit light. In other words, five local zones 12*i* corresponding to relevant light emitters 11 individually emit light. The light emission from relevant local zones 12*i* causes display objects to be individually displayed in four segmented zones dn located in row A2 within display range d illustrated in FIG. 3 and in one segmented zone dn located in row A3 and column B1 within display range d.

Third driver circuit 30*c* according to this embodiment is connected to one light emitter 11 located in row A3 and column B3 of backlight 10 and to one light emitter 11 located in row A3 and column B4 of backlight 10, and performs control for individually drawing electric current flowing through relevant light emitters 11. By performing this control, third driver circuit 30*c* causes two light emitters 11 to individually emit light. In other words, two local zones 12*i* corresponding to relevant light emitters 11 individually emit light. The light emission from relevant local zones 12*i* causes display objects to be individually displayed in one segmented zone dn located in row A3 and column B3 within display range d illustrated in FIG. 3 and in one segmented zone dn located in row A3 and column B4 within display range d.

Similar to the above, the display rate of each warning display region in display range d is, for example, 30%, whereas the display rate of the constant display region is 90%. As a result, the average power consumption of each of first driver circuit 30*a* and second driver circuit 30*b* is 0.3×4+0.9=2.1. The average power consumption of third driver circuit 30*c* is 0.9×2=1.8.

Accordingly, display device 100 according to this embodiment can suppress variation in average power consumption among the driver circuits, as compared with display device 100*x* described above. As a result, unevenness in heat generated in these driver circuits can be suppressed.

In the example in FIG. 6, current drawing unit 30 includes three driver circuits. However, the number of driver circuits included in current drawing unit 30 is not limited to three, and may be any number so long as the number is two or more. In the example in FIG. 6, the number of light emitters 11 connected to each driver circuit is five or two. However, the number is not limited to this number and may be any number so long as the number is one or more.

In other words, current drawing unit 30 according to this embodiment includes T (T being an integer of two or larger) driver circuits. Each of the T driver circuits is connected to at least one light emitter 11 of multiple light emitters 11. In this embodiment, assuming that the overall area of light emission surface 12 of backlight 10 is S, area $S_{Tn}$ of a local zone group including at least one local zone 12*i* that emits light in accordance with a specific driver circuit as any one of the T driver circuits satisfies $S_{Tn}<(S/T-S/N)$. Although the specific driver circuit is third driver circuit 30*c* in the example in FIG. 6, any of the T driver circuits may satisfy the condition $S_{Tn}<(S/T-S/N)$.

In detail, in the example in FIG. 6, area $S_{Tn}$ of the local zone group including at least one local zone 12*i* that emits light in accordance with third driver circuit 30*c* is 2. The area of one local zone 12*i* is 1. Area S of light emission surface 12 is 12, number T of driver circuits is 3, and number N of local zones 12*i* is 12. As a result, $S_{Tn}(=2)$ is smaller than $(S/T-S/N)=(12/3-12/12)=3$. Therefore, $S_{Tn}<(S/T-S/N)$ is satisfied.

In this case, S/T denotes an average area (also referred to as a first average area) of a local zone group controlled by one driver circuit, and S/N denotes an average area (also referred to as a second average area) of local zones 12*i*. Therefore, in this embodiment, area $S_{Tn}$ of the local zone group including at least one local zone 12*i* that emits light in accordance with the specific driver circuit is smaller than a difference between the first average area (S/T) and the second average area (S/N). Accordingly, area $S_{Tn}$ is different from the first average area (S/T), so that unevenness in heat generated in the driver circuits can be suppressed.

Because unevenness in heat generated in the driver circuits can be suppressed due to area $S_{Tn}$ being different from the first average area (S/T), area $S_{Tn}$ may satisfy $S_{Tn}>(S/T+S/N)$. In other words, area $S_{Tn}$ may be larger than a sum of the first average area (S/T) and the second average area (S/N). For example, the specific driver circuit is first driver circuit 30*a*, and first driver circuit 30*a* is connected to four light emitters 11 located in row A1 of backlight 10, one light emitter 11 located in row A3 and column B2, and one light emitter 11 located in row A3 and column B3. In this case, area $S_{Tn}$ is a sum of the areas of four local zones 12*i* located in row A1, one local zone 12*i* located in row A3 and column B2, and one local zone 12*i* located in row A3 and column B3, and is equal to 6. As a result, $S_{Tn}(=6)$ is larger than $(S/T+S/N)=(12/3+12/12)=5$. Therefore, $S_{Tn}>(S/T+S/N)$ is satisfied. In this case, area $S_{Tn}$ is similarly different from the first average area (S/T), so that unevenness in heat generated in the driver circuits can be suppressed.

Accordingly, in this embodiment, area $S_{Tn}$ satisfies $S_{Tn}>(S/T+S/N)$ or $S_{Tn}<(S/T-S/N)$. Consequently, unevenness in heat generated in the driver circuits can be suppressed. In other words, if area $S_{Tn}$ of the local zone group including at least one local zone 12*i* that emits light in accordance with the specific driver circuit is larger than the sum of the first average area (S/T) and the second average area (S/N), the areas of local zone groups respectively controlled by at least two driver circuits can be varied from each other. Furthermore, if area $S_{Tn}$ is smaller than the difference between the first average area (S/T) and the second average area (S/N), the areas of local zone groups respectively controlled by at least two driver circuits can also be varied from each other. As a result, even in the case where a liquid crystal panel includes a constant display region and a warning display region, a local zone group is set in accordance with an average amount of heat generated in local zones 12*i*, so that unevenness in heat generated in current drawing unit 30, that is, T driver circuits, can be suppressed. Therefore, a temperature increase caused by heat generated in the driver circuits can be suppressed.

Furthermore, in this embodiment, light emission surface 12 includes a first region and a second region. The first region includes at least one local zone 12*i* of N local zones 12*i*. The second region includes at least one local zone 12*i* of N local zones 12*i*, and emits light for a longer period of time than the first region. In the example in FIG. 6, the first region includes four local zones 12*i* located in row A1 or row A2 of backlight 10 and corresponds to a warning display region. The second region includes four local zones 12*i* located in row A3 of backlight 10 and corresponds to a constant display region. Accordingly, when the liquid crystal panel includes two regions with different display time periods, such as the constant display region and the warning display region, unevenness in heat generated in current drawing unit 30, that is, T driver circuits, can be suppressed.

Furthermore, in this embodiment, the local zone group that emits light in accordance with the specific driver circuit includes local zones 12*i* in the second region. The local zone group may only include at least one local zone 12*i* in the second region. In the example in FIG. 6, the local zone group that emits light in accordance with third driver circuit 30*c* serving as the specific driver circuit includes only two local zones 12*i* located in the second region. Two local zones 12*i* located in the second region are local zone 12*i* located in row A3 and column B3 and local zone 12*i* located in row A3 and column B4. Accordingly, when $S_{Tn}<(S/T-S/N)$ is satisfied, the display frequency of the local zone group corresponding to the specific driver circuit (Tn) is high, so that even if the local zone group is emitting light for a relatively long period of time, area $S_{Tn}$ of the local zone group is smaller than average. Thus, heat generated in the specific driver circuit can be suppressed, and can be made nearly equal to that in the other driver circuits.

Furthermore, in this embodiment, T driver circuits include two driver circuits. Of multiple light emitters 11, the number of light emitters 11 connected to one of the two driver circuits and the number of light emitters 11 connected to the other one of the two driver circuits are different from each other by two or more. In the example in FIG. 6, the two driver circuits are, for example, second driver circuit 30*b* and third driver circuit 30*c*. The number of light emitters 11 connected to second driver circuit 30*b* is five, and the number of light emitters 11 connected to third driver circuit 30*c* is two. Therefore, the number of light emitters 11 connected to second driver circuit 30*b* and the number of light emitters 11 connected to third driver circuit 30*c* are different from each other by two or more. Consequently, the numbers of light emitters 11 connected to the two respective driver circuits are different from each other by two or more. Thus, even when multiple light emitters 11 include at least one light emitter 11 with high load power and at least one light emitter 11 with low load power, the possibility of causing the two driver circuits to have nearly equal average power consumption can be enhanced.

Furthermore, in this embodiment, it can be regarded that each driver circuit and each light emitter 11 are connected such that the driver circuits have nearly equal average power consumption, that is, uniform average power consumption, in accordance with the light emission time of each light emitter 11. The average mentioned above refers to a temporal average.

(Variation 1)

In a display device according to this variation, two driver circuits alternately draw electric current flowing through one light emitter 11 in a switching fashion.

Figure 7:
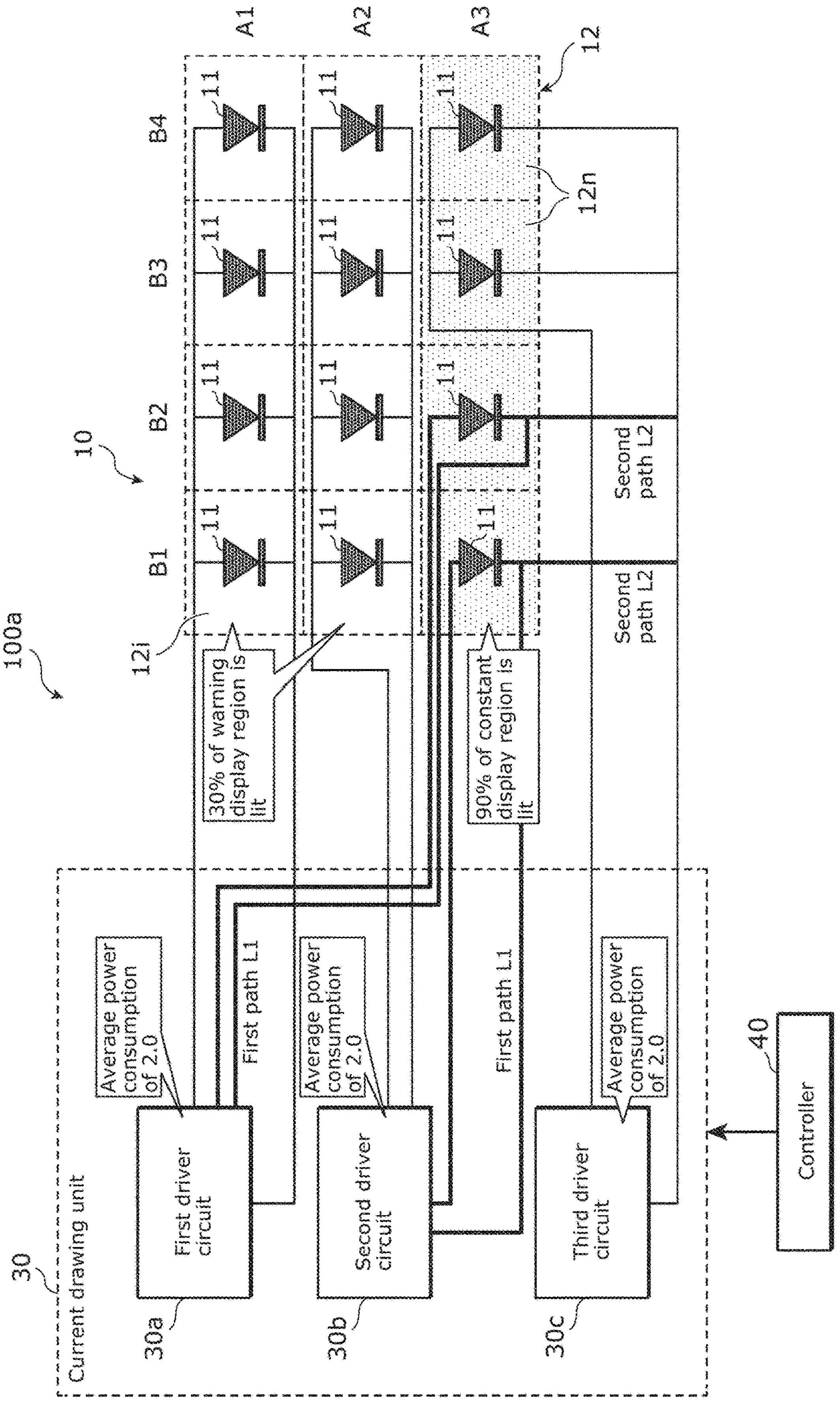
FIG. 7 is a diagram for explaining the configuration of a display device according to Variation 1 of the embodiment and heat generated in the current drawing unit included in the display device.

FIG. 7 is a diagram for explaining the configuration of the display device according to this variation and heat generated in current drawing unit 30 included in the display device.

Display device 100*a* according to this variation includes controller 40 that controls three driver circuits, namely, first driver circuit 30*a*, second driver circuit 30*b*, and third driver circuit 30*c*. In other words, display device 100*a* includes controller 40 that controls T driver circuits. Of T driver circuits, controller 40 switches a driver circuit that draws electric current flowing through any one light emitter 11 included in multiple light emitters 11 to another driver circuit.

For example, controller 40 switches the driver circuit that draws electric current flowing through light emitter 11 located in row A3 and column B2 alternately between first driver circuit 30*a* and third driver circuit 30*c*. For example, controller 40 causes first driver circuit 30*a* and third driver circuit 30*c* to draw electric current flowing through relevant light emitter 11 based on a time ratio of ta1:ta3. In other words, controller 40 causes first driver circuit 30*a* to draw electric current flowing through relevant light emitter 11 during time period ta1, and subsequently causes third driver circuit 30*c* to draw electric current flowing through relevant light emitter 11 during time period ta3. Controller 40 causes first driver circuit 30*a* to draw electric current and third driver circuit 30*c* to draw electric current in an alternating fashion.

As a result, the electric current flowing through light emitter 11 located in row A3 and column B2 is drawn to first driver circuit 30*a* via first path L1 during time period ta1, and is drawn to third driver circuit 30*c* via second path L2 during time period ta3.

Likewise, controller 40 switches the driver circuit that draws electric current flowing through light emitter 11 located in row A3 and column B1 alternately between second driver circuit 30*b* and third driver circuit 30*c*. For example, controller 40 causes second driver circuit 30*b* and third driver circuit 30*c* to draw electric current flowing through relevant light emitter 11 based on a time ratio of tb2:tb3. In other words, controller 40 causes second driver circuit 30*b* to draw electric current flowing through relevant light emitter 11 during time period tb2, and subsequently causes third driver circuit 30*c* to draw electric current flowing through relevant light emitter 11 during time period tb3. Controller 40 causes second driver circuit 30*b* to draw electric current and third driver circuit 30*c* to draw electric current in an alternating fashion.

As a result, the electric current flowing through light emitter 11 located in row A3 and column B1 is drawn to second driver circuit 30*b* via first path L1 during time period tb2, and is drawn to third driver circuit 30*c* via second path L2 during time period tb3.

This variation is similar to the above embodiment in that first driver circuit 30*a* draws electric current flowing through each of four light emitters 11 located in row A1 of backlight 10. Moreover, second driver circuit 30*b* draws electric current flowing through each of four light emitters 11 located in row A2 of backlight 10. Third driver circuit 30*c* draws electric current flowing through light emitter 11 located in row A3 and column B3 and light emitter 11 located in row A3 and column B4.

Accordingly, first driver circuit 30*a*, second driver circuit 30*b*, and third driver circuit 30*c* can have nearly equal average power consumption of, for example, 2.0. In other words, in display device 100*a* according to this variation, the driver circuits can have nearly equal average power consumption more than in display device 100 according to the above embodiment, so that unevenness in generated heat can be further suppressed.

Figure 8:
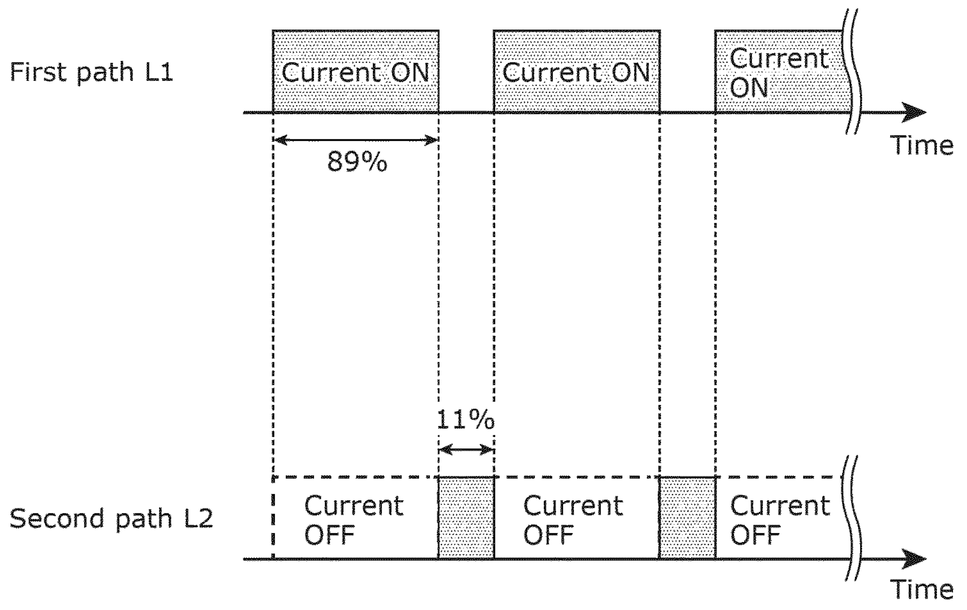
FIG. 8 is a diagram illustrating an example of switching timings of driver circuits according to Variation 1 of the embodiment.

FIG. 8 is a diagram illustrating an example of switching timings of driver circuits. In other words, FIG. 8 illustrates a timing at which electric current flows through first path L1 and a timing at which electric current flows through second path L2.

Controller 40 switches the driver circuit that draws electric current flowing through light emitter 11 for each of light emitter 11 located in row A3 and column B2 and light emitter 11 located in row A3 and column B1. In detail, controller 40 switches the driver circuit that draws electric current flowing through light emitter 11 located in row A3 and column B2 to first driver circuit 30*a*. Moreover, controller 40 switches the driver circuit that draws electric current flowing through light emitter 11 located in row A3 and column B1 to second driver circuit 30*b*.

As a result, the electric current flows through first path L1. For example, controller 40 switches driver circuits so that the electric current flows through first path L1 (i.e., so that the electric current is turned on) at 89% of the time period during which the electric current is flowing through each of light emitter 11 located in row A3 and column B2 and light emitter 11 located in row A3 and column B1.

Subsequently, controller 40 switches the driver circuit that draws electric current flowing through light emitter 11 located in row A3 and column B2 to third driver circuit 30*c*. Moreover, controller 40 switches the driver circuit that draws electric current flowing through light emitter 11 located in row A3 and column B1 to third driver circuit 30*c*. As a result, the electric current flows through second path L2. For example, controller 40 switches driver circuits so that the electric current flows through second path L2 (i.e., so that the electric current is turned on) at 11% of the time period during which the electric current is flowing through each of light emitter 11 located in row A3 and column B2 and light emitter 11 located in row A3 and column B1.

Accordingly, first driver circuit 30*a* and third driver circuit 30*c* draw electric current flowing through light emitter 11 located in row A1 and column B2 in a time shared manner at a time ratio of ta1:ta3=89:11. Likewise, second driver circuit 30*b* and third driver circuit 30*c* draw electric current flowing through light emitter 11 located in row A1 and column B1 in a time shared manner at a time ratio of tb2:tb3=89:11.

Figure 9:
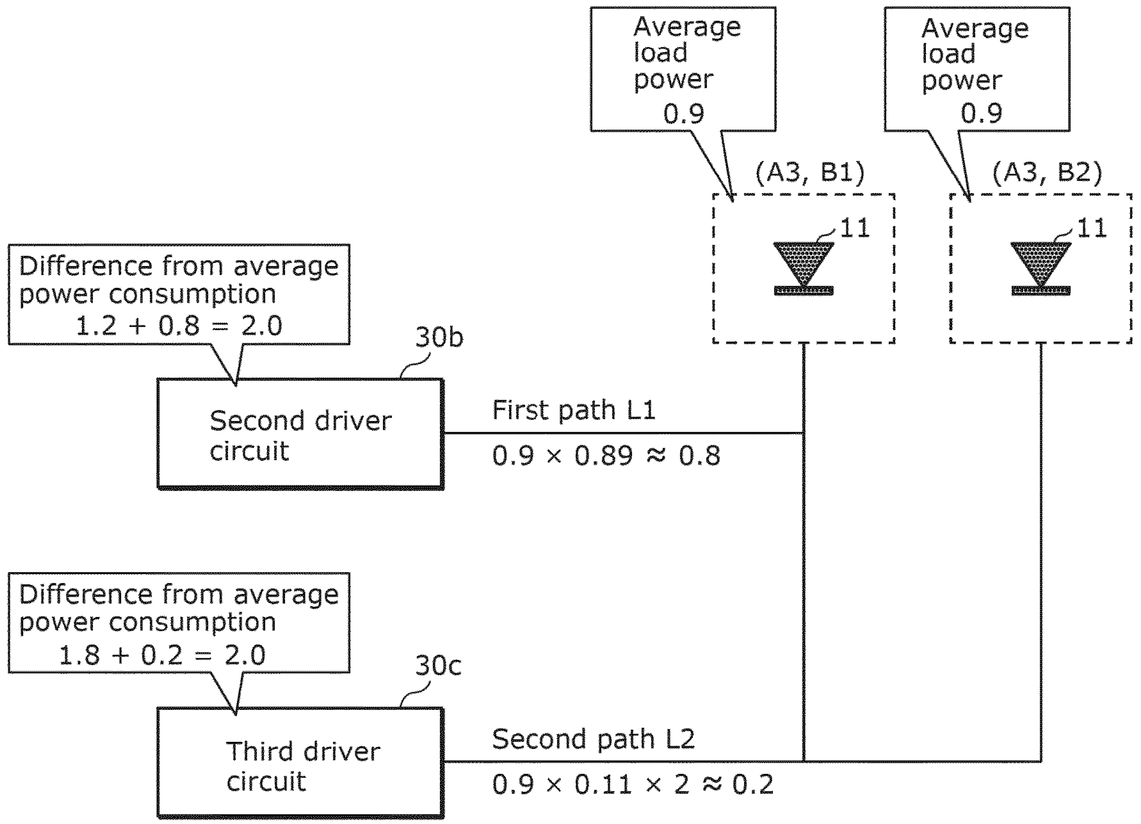
FIG. 9 is a diagram for explaining that a second driver circuit and a third driver circuit have nearly equal average power consumption in Variation 1 of the embodiment.

FIG. 9 is a diagram for explaining that second driver circuit 30*b* and third driver circuit 30*c* have nearly equal average power consumption.

Second driver circuit 30*b* draws electric current flowing through four light emitters 11 located in row A2 of backlight 10. The average load power of each of four light emitters 11 is 0.3. Therefore, the average power consumption for drawing electric current is 0.3×4=1.2. Moreover, second driver circuit 30*b* draws 89% of electric current flowing through light emitter 11 located in row A3 and column B1. The average load power of relevant light emitter 11 is 0.9. Therefore, the average power consumption for drawing the electric current is 0.9×0.89≈0.8. As a result, the average power consumption in second driver circuit 30*b* is 1.2+0.8=2.0.

Third driver circuit 30*c* draws electric current flowing through each of light emitter 11 located in row A3 and column B3 of backlight 10 and light emitter 11 located in row A3 and column B4. The average load power of each of relevant light emitters 11 is 0.9. Therefore, the average power consumption for drawing electric current is 0.9×2=1.8. Moreover, third driver circuit 30*c* draws 11% of electric current flowing through light emitter 11 located in row A3 and column B1, and draws 11% of electric current flowing through light emitter 11 located in row A3 and column B2. The average load power of each of relevant light emitters 11 is also 0.9. Therefore, the average power consumption for drawing the electric current is 0.9×0.11×2≈0.2. As a result, the average power consumption in third driver circuit 30*c* is 1.8+0.2=2.0.

Accordingly, second driver circuit 30*b* and third driver circuit 30*c* can have nearly equal average power consumption of 2.0. Likewise, the average power consumption of first driver circuit 30*a* can also be set to 2.0. As a result, first driver circuit 30*a*, second driver circuit 30*b*, and third driver circuit 30*c* can have substantially equal average power consumption. In other words, unevenness in heat generated in two switchable driver circuits can be further suppressed. As a result, in this variation, unevenness in generated heat can be further suppressed, as compared with display device 100 according to the above embodiment.

This variation is similar to the above embodiment in that area $S_{Tn}$ of a local zone group including at least one local zone 12*i* that emits light in accordance with a specific driver circuit is 2, and that $S_{Tn}<(S/T-S/N)$ is satisfied. In other words, the specific driver circuit according to this variation is third driver circuit 30*c*, and the number of local zones 12*i* that emit light in accordance with third driver circuit 30*c* alone is two. Two local zones 12*i* are local zone 12*i* located in row A3 and column B3 and local zone 12*i* located in row A3 and column B4. Therefore, it can be regarded that area $S_{Tn}$ is 2.

(Variation 2)

In a display device according to this variation, channels and terminals included in a driver circuit are arranged in a distributed manner.

Figure 10:
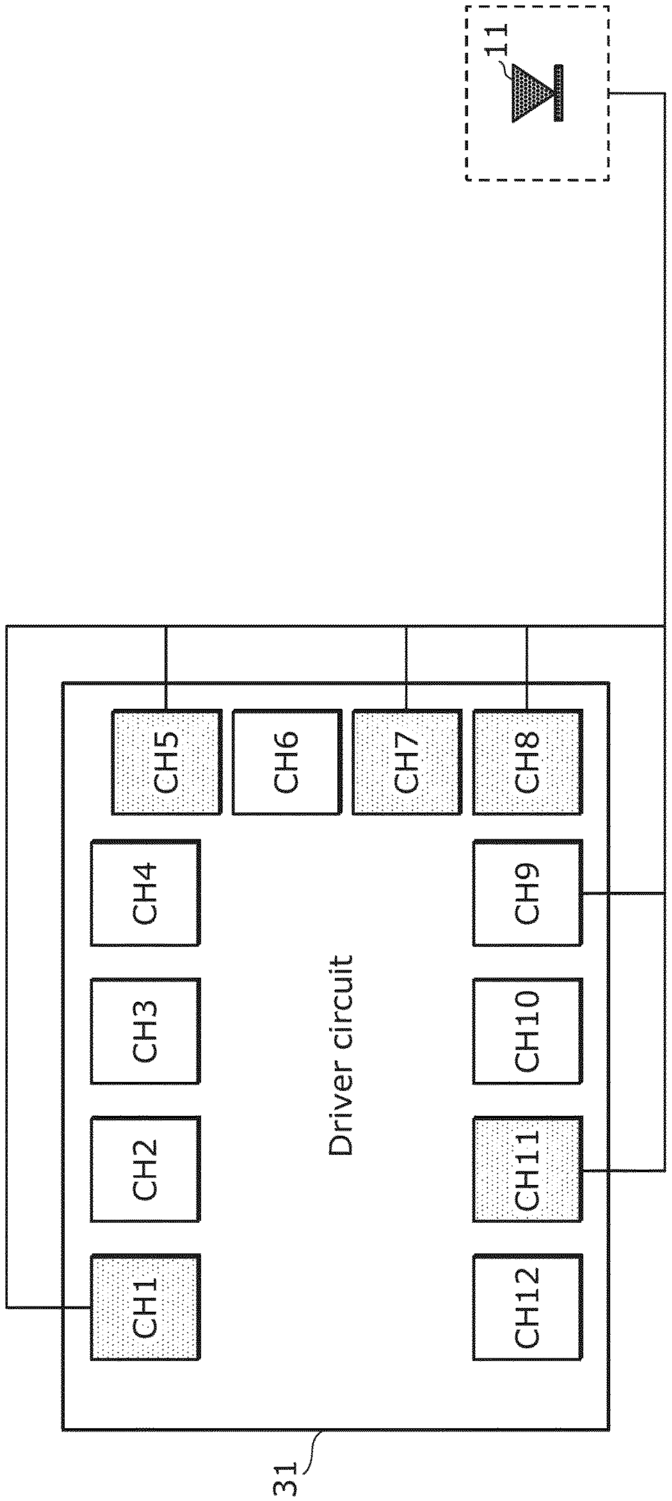
FIG. 10 is a diagram illustrating a configuration example of a driver circuit according to Variation 2 of the embodiment.

FIG. 10 is a diagram illustrating a configuration example of a driver circuit.

As illustrated in FIG. 10, driver circuit 31 included in current drawing unit 30 includes multiple channels (i.e., channels CH1 to CH12). Driver circuit 31 may be any of first driver circuit 30*a*, second driver circuit 30*b*, or third driver circuit 30*c*.

Each of channels CH1 to CH12 is, for example, a switch, such as a transistor, for switching between on and off for drawing electric current. One light emitter 11 is connected to multiple channels of channels CH1 to CH12. In detail, light emitter 11 is connected to channels CH1, CH5, CH7, CH8, and CH11.

If each of channels CH1, CH5, CH7, CH8, and CH11 is disposed adjacent to another channel among these channels, unevenness tends to occur in heat generated in driver circuit 31. In other words, in driver circuit 31, heat is likely to be generated in the sections where channels CH1, CH5, CH7, CH8, and CH11 are disposed, whereas heat is less likely to be generated in the other sections.

In this variation, the multiple channels connected to single light emitter 11 are arranged in driver circuit 31 in a distributed manner. In other words, any two connection channels of the multiple channels (i.e., multiple connection channels) connected to single light emitter 11 have a remaining one or more channels disposed therebetween. The remaining one or more channels may be connected to light emitter 11 different from aforementioned single light emitter 11, or may be connected to any of light emitters 11.

Any of first driver circuit 30*a*, second driver circuit 30*b*, or third driver circuit 30*c* may serve as driver circuit 31. At least one of first driver circuit 30*a*, second driver circuit 30*b*, or third driver circuit 30*c* may serve as driver circuit 31.

Accordingly, in this variation, at least one driver circuit of T driver circuits includes multiple channels for switching between on and off for drawing electric current. In the example in FIG. 10, the multiple channels are channels CH1 to CH12. The multiple channels include multiple connection channels, and each of the multiple connection channels is connected to any one light emitter 11 of multiple light emitters 11. In the example in FIG. 10, the multiple connection channels are channels CH1, CH5, CH7, CH8, and CH11. One or more channels not connected to aforementioned single light emitter 11 are disposed between two connection channels of the multiple connection channels. In the example in FIG. 10, channels CH2 to CH4 not connected to relevant single light emitter 11 are disposed between channel CH1 and channel CH5 serving as the two connection channels.

Accordingly, the multiple connection channels are arranged in a distributed manner without all of them being adjacent to each other, so that heat generated in the channels can be distributed. Therefore, unevenness in heat generated in driver circuit 31 can be suppressed.

As an alternative to the connection channels being arranged in a distributed manner in the example in FIG. 10, the terminals of the connection channels may be arranged in a distributed manner.

Figure 11:
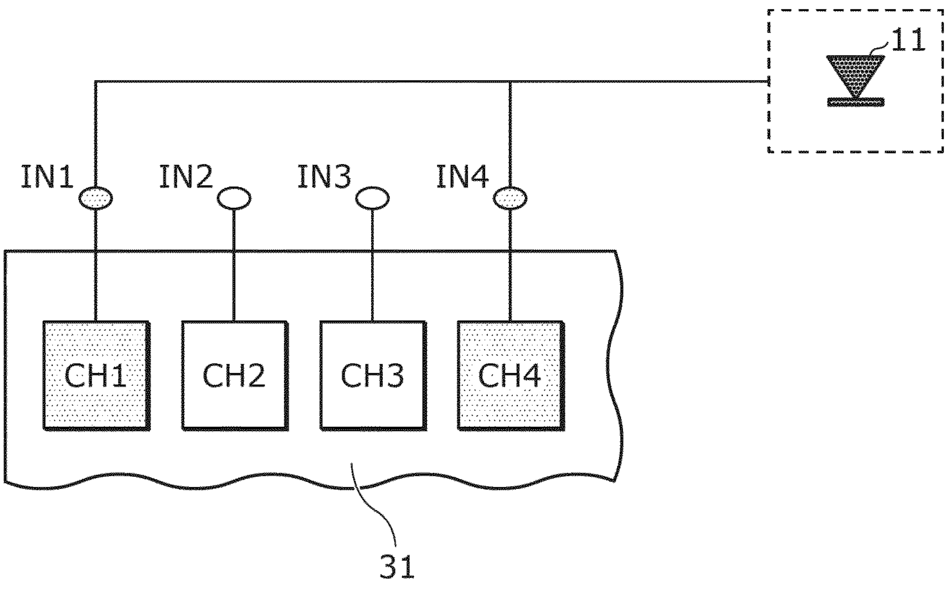
FIG. 11 is a diagram illustrating another configuration example of the driver circuit according to Variation 2 of the embodiment.

FIG. 11 is a diagram illustrating another configuration example of driver circuit 31.

As illustrated in FIG. 11, driver circuit 31 included in current drawing unit 30 includes multiple channels (i.e., channels CH1 to CH4). Channels CH1 to CH4 respectively include terminals IN1 to IN4 for connecting to light emitter 11.

In this variation, multiple terminals (i.e., multiple connection terminals) connected to single light emitter 11 may be arranged in a distributed manner in driver circuit 31.

Accordingly, in this variation, at least one driver circuit of T driver circuits includes multiple terminals. In the example in FIG. 11, the multiple terminals are terminals IN1 to IN4. The multiple terminals include multiple connection terminals. Each of the multiple connection terminals is connected to any one light emitter 11 of multiple light emitters 11. In the example in FIG. 11, the multiple connection terminals are terminals IN1 to IN4. One or more terminals not connected to aforementioned single light emitter 11 are disposed between two connection terminals of the multiple connection terminals. In the example in FIG. 11, terminals IN2 and IN3 that are not connected to relevant single light emitter 11 are disposed between terminals IN1 and IN4 serving as the two connection terminals.

Accordingly, the multiple connection terminals are arranged in a distributed manner without all of them being adjacent to each other, so that the connection channels corresponding to the connection terminals can also be arranged in a distributed manner. Therefore, heat generated in the connection channels can be distributed. Consequently, unevenness in heat generated in driver circuit 31 can be suppressed.

There is a case where a channel and a terminal of the channel are not disposed close to each other.

Figure 12:
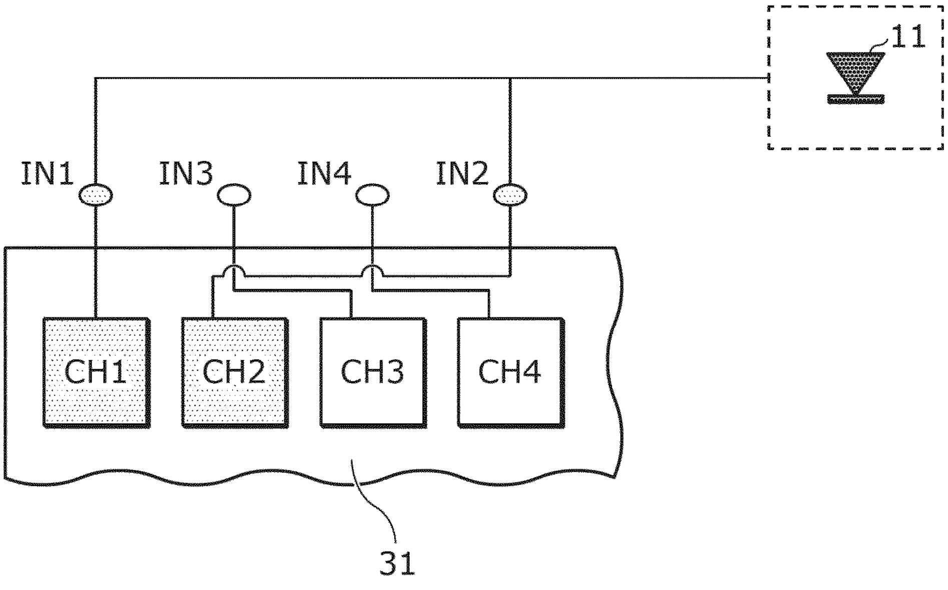
FIG. 12 is a diagram illustrating yet another configuration example of the driver circuit according to Variation 2 of the embodiment.

FIG. 12 is a diagram illustrating yet another configuration example of driver circuit 31.

In driver circuit 31 illustrated in FIG. 12, channel CH2 and terminal IN2 of channel CH2 are not disposed close to each other. Similarly, channel CH3 and terminal IN3 of channel CH3 are not disposed close to each other, and channel CH4 and terminal IN4 of channel CH4 are not disposed close to each other.

Therefore, in driver circuit 31 illustrated in FIG. 12, even if terminals IN1 and IN2 connected to single light emitter 11 are arranged in a distributed manner, channels CH1 and CH2 corresponding to terminals IN1 and IN2 may sometimes be not arranged in a distributed manner. Thus, if multiple channels and the terminals of the respective channels are not disposed close to each other, light emitter 11 and the multiple connection channels are connected such that the multiple connection channels are arranged in a distributed manner.

Although a display device according to one or more aspects of the present disclosure has been described above based on the embodiment and the variations, the present disclosure is not limited to the embodiment and the variations. Various kinds of variations applied to the embodiment and variations described above and conceivable by a skilled person may be included in the present disclosure so long as they do not depart from the scope of the present disclosure. A mode established by combining components in the embodiment and the variations may also be included in the present disclosure.

For example, as an alternative to being included in head-up display 400, the display device according to each of the embodiment and variations described above may be included in another display, such as a decorative display. Moreover, the display device according to each of the embodiment and variations described above does not have to be installed in a moving body, such as vehicle V.

As an alternative to each of the embodiment and variations described above in which one light emitter 11 is disposed in one local zone 12*i*, at least two light emitters 11 may be disposed in one local zone 12*i*. Moreover, multiple local zones 12*i* on light emission surface 12 may have different areas.

In Variation 1 described above, controller 40 may be constituted of dedicated hardware, or may be implemented by executing a software program. Controller 40 may be implemented by a program executer, such as a central processing unit (CPU) or a processor, loading and executing a software program stored in a storage medium, such as a hard disk or a semiconductor memory.

Further Information about Technical Background to this Application

The disclosure of the following patent application including specification, drawings, and claims is incorporated herein by reference in their entirety: Japanese Patent Application No. 2024-139383 filed on Aug. 21, 2024.

INDUSTRIAL APPLICABILITY

The present disclosure is applicable to, for example, a display device installed in, for example, a vehicle.

The invention claimed is:

1. A display device that performs local dimming, the display device comprising:

a plurality of light emitters arranged in a matrix; and a current drawing circuit that performs control for drawing electric current flowing through the plurality of light emitters to achieve the local dimming by the plurality of light emitters on a light emission surface, the current drawing circuit including T driver circuits, T being an integer of at least 2, wherein each of the T driver circuits is connected to at least one light emitter of the plurality of light emitters, the light emission surface is divided into N local zones in correspondence with a layout of the plurality of light emitters, N being an integer of at least 2, and when an area of the light emission surface is defined as S, with the area of the emission surface S being equal to a total number of the N local zones, and an area $S_{Tn}$ of a local zone group including at least one local zone that emits light in accordance with a specific driver circuit being any one of the T driver circuits, with the area $S_{Tn}$ being a portion of the area of the light emission surface S, the display device satisfies $S_{Tn}>(S/T+S/N)$ or $S_{Tn}<(S/T-S/N)$.

2. The display device according to claim 1, wherein the light emission surface includes a first region and a second region, the first region includes at least a first local zone of the N local zones, the second region includes at least a second local zone of the N local zones, and the T driver circuits are configured to cause the second region to emit light for a longer period of time than the first region.

3. The display device according to claim 2, wherein the local zone group that emits the light in accordance with the specific driver circuit includes at least the second local zone included in the second region.

4. The display device according to claim 1, further comprising:

a controller that controls the T driver circuits, wherein the controller switches a first driver circuit that is included in the T driver circuits and that draws the electric current flowing through any one light emitter included in the plurality of light emitters to a second driver circuit included in the T driver circuits.

5. The display device according to claim 1, wherein the T driver circuits include two driver circuits, and a number of first light emitters included in the plurality of light emitters and connected to a first one of the two driver circuits and a number of second light emitters included in the plurality of light emitters and connected to a second one of the two driver circuits differ in quantity by at least two.

6. The display device according to claim 1, wherein at least one driver circuit of the T driver circuits includes a plurality of terminals, the plurality of terminals includes a plurality of connection terminals, each of the plurality of connection terminals is connected to one light emitter serving as any one of the plurality of light emitters, and a terminal included in the plurality of terminals and not connected to the one light emitter is disposed between two connection terminals of the plurality of connection terminals.

7. The display device according to claim 1, wherein at least one driver circuit of the T driver circuits includes a plurality of channels each of which switches between on and off for drawing the electric current, the plurality of channels includes a plurality of connection channels, each of the plurality of connection channels is connected to one light emitter serving as any one of the plurality of light emitters, and a channel included in the plurality of channels and not connected to the one light emitter is disposed between two connection channels of the plurality of connection channels.

8. A head-up display comprising:

the display device according to claim 1;

a mirror that reflects light output from the display device; and a housing that accommodates the display device and the mirror.

9. The display device according to claim 1, wherein each local zone group corresponds to one of the T driver circuits and includes an illumination area corresponding to local zones controlled by the one of the T driver circuits, and the light emission surface S is a sum of areas of the local zone groups, the local zone groups corresponding to the T driver circuits have different areas, and the area $S_{Tn}$ of the local zone group including at least the one local zone that emits light in accordance with the specific driver circuit satisfies $S_{Tn}>(S/T+S/N)$ or $S_{Tn}<(S/T-S/N)$.

* * * * *